(12) United States Patent
Womack et al.

(10) Patent No.: US 7,222,913 B2
(45) Date of Patent: May 29, 2007

(54) FRAME FOR A MOTOR VEHICLE

(75) Inventors: Darren A. Womack, Windsor (CA); Gianfranco Gabbianelli, Troy, MI (US); William R. Perry, Shelby Township, MI (US)

(73) Assignee: Magna International Inc., Ontario (CA)

( * ) Notice: Subject to any disclaimer, the term of this patent is extended or adjusted under 35 U.S.C. 154(b) by 0 days.

(21) Appl. No.: 11/097,386

(22) Filed: Apr. 4, 2005

(65) Prior Publication Data

US 2005/0225120 A1    Oct. 13, 2005

Related U.S. Application Data

(60) Provisional application No. 60/558,564, filed on Apr. 2, 2004.

(51) Int. Cl.
*B60R 27/00* (2006.01)
(52) U.S. Cl. .................................... 296/205
(58) Field of Classification Search ............ 296/181.1, 296/182.1, 183.1, 184.1, 203.01, 204, 205, 296/203.04; 180/311
See application file for complete search history.

(56) References Cited

U.S. PATENT DOCUMENTS

| | | | |
|---|---|---|---|
| 4,333,678 A * | 6/1982 | Munoz et al. ............ | 296/39.2 |
| 5,188,418 A | 2/1993 | Walworth, Jr. et al. | |
| 5,333,775 A | 8/1994 | Bruggemann et al. | |
| 5,491,883 A | 2/1996 | Marlinga | |
| 5,511,848 A | 4/1996 | Mobley | |
| 5,882,039 A | 3/1999 | Beckman et al. | |
| 5,884,722 A | 3/1999 | Durand et al. | |
| 5,938,272 A | 8/1999 | Jurica et al. | |
| 6,003,935 A | 12/1999 | Kalazny | |
| 6,015,182 A | 1/2000 | Weissert et al. | |
| 6,092,865 A | 7/2000 | Jaekel et al. | |
| 6,122,948 A | 9/2000 | Moses | |
| 6,126,199 A | 10/2000 | Valin et al. | |
| 6,183,013 B1 | 2/2001 | Mackenzie et al. | |
| 6,216,509 B1 | 4/2001 | Lotspaih et al. | |
| 6,416,119 B1 | 7/2002 | Gericke et al. | |
| 6,533,348 B1 | 3/2003 | Jaekel et al. | |
| 6,729,682 B2 * | 5/2004 | Delavalle et al. ...... | 296/193.08 |
| 6,742,258 B2 | 6/2004 | Tarbutton et al. | |

(Continued)

FOREIGN PATENT DOCUMENTS

JP    355148662 A    11/1980

*Primary Examiner*—H. Gutman
(74) *Attorney, Agent, or Firm*—Pillsbury Winthrop Shaw Pittman LLP

(57) ABSTRACT

A continuous, hydroformed tubular member includes a horizontal member having a first end and a second end. A first vertical member has a first lower end coupled to the first end of the horizontal member. The first vertical member also has a first upper pillar-free end to form a first pillar configured to form a terminal end of an upwardly-open rear bed of a motor vehicle. A second vertical member has a second lower end coupled to the second end of the horizontal member. The second vertical member also has a second upper pillar-free end to form a second pillar configured to form the terminal end of the upwardly-open rear bed of a motor vehicle. The horizontal member, the first vertical member, and the second vertical member together form a one-piece, unitary U-shaped member.

5 Claims, 8 Drawing Sheets

U.S. PATENT DOCUMENTS

| | | |
|---|---|---|
| 6,769,178 B1 | 8/2004 | Beckman |
| 6,846,037 B2 * | 1/2005 | Engels et al. .......... 296/193.04 |
| 2004/0245805 A1 * | 12/2004 | Jaeck ...................... 296/182.1 |
| 2005/0225120 A1 * | 10/2005 | Womack et al. ............ 296/205 |
| 2005/0242620 A1 * | 11/2005 | McNulty ................. 296/183.1 |
| 2006/0076804 A1 * | 4/2006 | Ni et al. ..................... 296/204 |
| 2006/0082191 A1 * | 4/2006 | McNulty et al. ......... 296/183.1 |
| 2006/0087153 A1 * | 4/2006 | Lendway et al. ...... 296/187.01 |

* cited by examiner

FRAME FOR A MOTOR VEHICLE

This application claims priority to U.S. Provisional Application No. 60/558,564, filed Apr. 2, 2004, which is incorporated herein in its entirety by reference thereto.

BACKGROUND OF THE INVENTION

Field of the Invention

The present invention relates to frames for motor vehicles. In particular, the present invention relates to frames for motor vehicles with open beds.

SUMMARY OF THE INVENTION

One aspect of the invention relates to a continuous, hydroformed tubular member, including a horizontal member having a first end and a second end. A first vertical member has a first lower end coupled to the first end of the horizontal member. The first vertical member also has a first upper pillar-free end to form a first pillar configured to form a terminal end of an upwardly-open rear bed of a motor vehicle. A second vertical member has a second lower end coupled to the second end of the horizontal member. The second vertical member also has a second upper pillar-free end to form a second pillar configured to form the terminal end of the upwardly-open rear bed of a motor vehicle. The horizontal member, the first vertical member, and the second vertical member together form a one-piece, unitary U-shaped member.

Another aspect of the invention relates to a frame for a motor vehicle. The frame includes a continuous, hydroformed tubular member. The tubular member has a horizontal member having a first end and a second end. A first vertical member has a first lower end coupled to the first end of the horizontal member. The first vertical member also has a first upper pillar-free end to form a first pillar configured to form a terminal end of an upwardly-open rear bed of a motor vehicle. A second vertical member has a second lower end coupled to the second end of the horizontal member. The second vertical member also has a second upper pillar-free end to form a second pillar configured to form the terminal end of the upwardly-open rear bed of a motor vehicle. The horizontal member, the first vertical member, and the second vertical member together form a one-piece, unitary U-shaped member. A first side panel is coupled to the first vertical member and includes a first rear wheel well to form a first side of the bed. A second side panel is coupled to the second vertical member and includes a second rear wheel well to form a second side of the bed. A floor panel is coupled between the first and second side panels and the horizontal member of the tubular member to form the floor of the bed.

Another aspect of the invention relates to a frame for a motor vehicle. The frame includes first and second continuous, hydroformed tubular members. Each of the first and second tubular members have: a horizontal member having a first end and a second end; a first vertical member having a first lower end coupled to the first end of the horizontal member, the first vertical member also having a first upper pillar-free end to form a first pillar configured to form a terminal end of an upwardly-open rear bed of a motor vehicle; and a second vertical member having a second lower end coupled to the second end of the horizontal member, the second vertical member also having a second upper pillar-free end to form a second pillar configured to form the terminal end of the upwardly-open rear bed of a motor vehicle. The horizontal member, the first vertical member, and the second vertical member of each of the first and second tubular member together form a one-piece, unitary U-shaped member. A first stringer member extends from the first upper pillar-free end of the first tubular member to the first upper pillar-free end of the second tubular member to structurally secure and interconnect the first vertical members of the first and second tubular members. A second stringer member extends from the second upper pillar-free end of the first tubular member to the second upper pillar-free end of the second tubular member to structurally secure and interconnect the second vertical members of the first and second tubular members.

Still another aspect of the invention relates to a frame for a motor vehicle. The frame includes a pair of rearwardmost-pillars and a pair of rearward-pillars that are positioned forward of the rearwardmost-pillars. Each of the pair of rearwardmost-pillars have an upper, pillar-free end and a lower end. Each of the pair of rearward-pillars have an upper, pillar-free end and a lower end. A floor panel is coupled between the pair of rearwardmost-pillars and the pair of rearward-pillars adjacent the lower ends of the pair of rearwardmost-pillars and the pair of rearward-pillars to form a floor of an upwardly-open rear bed of the motor vehicle. A first main side panel is coupled between the one of the pair of rearwardmost-pillars and one of the pair of rearward-pillars and includes a first rear wheel well. A second main side panel is coupled between the other one of the pair of rearwardmost-pillars and to the other one of the pair of rearward-pillars and includes a second rear wheel well. A first side panel extension is attached to the first main side panel and is positioned between the one of the pair of rearwardmost-pillars and the one of the pair of rearward-pillars such that the first main side panel and the first side panel extension together form a first side of the bed. A second side panel extension is attached to the second main side panel and is positioned between the other one of the pair of rearwardmost-pillars and the other one of the pair of rearward-pillars such that the second main side panel and the second side panel extension together form a second side of the bed.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
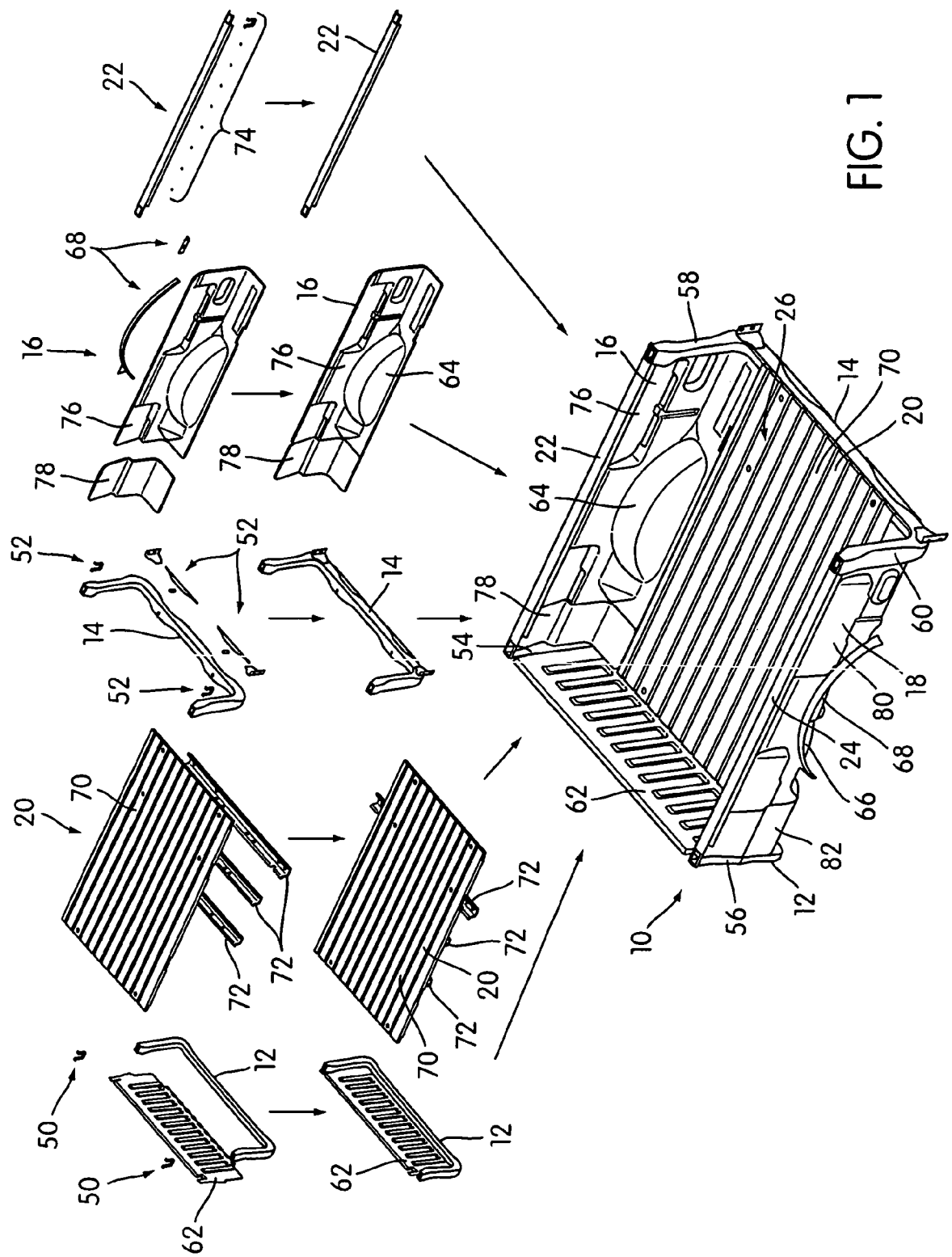
FIG. 1 is an exploded assembly view illustrating a frame constructed in accordance with an embodiment of the invention.

FIG. 1 illustrates a frame 10 for a motor vehicle constructed according to an embodiment of the present invention. In the illustrated embodiment, the frame 10 forms an upwardly open rear bed (also referred to as a vehicle bed, truck bed, or a pick-up box) that is mounted rearwardly of a vehicle cab of a motor vehicle. As is conventional, the vehicle cab is designed to accommodate passengers, including a driver, and has the various controls for operating the vehicle. The frame 10 may be practiced with any type of motor vehicle having a rear bed, e.g., a pickup truck.

In the embodiment shown, the frame 10 includes first and second continuous, hydroformed tubular members 12, 14, first and second side panels 16, 18 (only the side panel 16 being shown in the exploded portion of the assembly) extending between the first and second tubular members 12, 14, a floor panel 20, and first and second stringer members 22, 24 (only the stringer member 22 being shown in the exploded portion of the assembly). These components are securely mounted to one another to define an interior space 26 having an upwardly facing opening for transporting objects.

Figure 2:
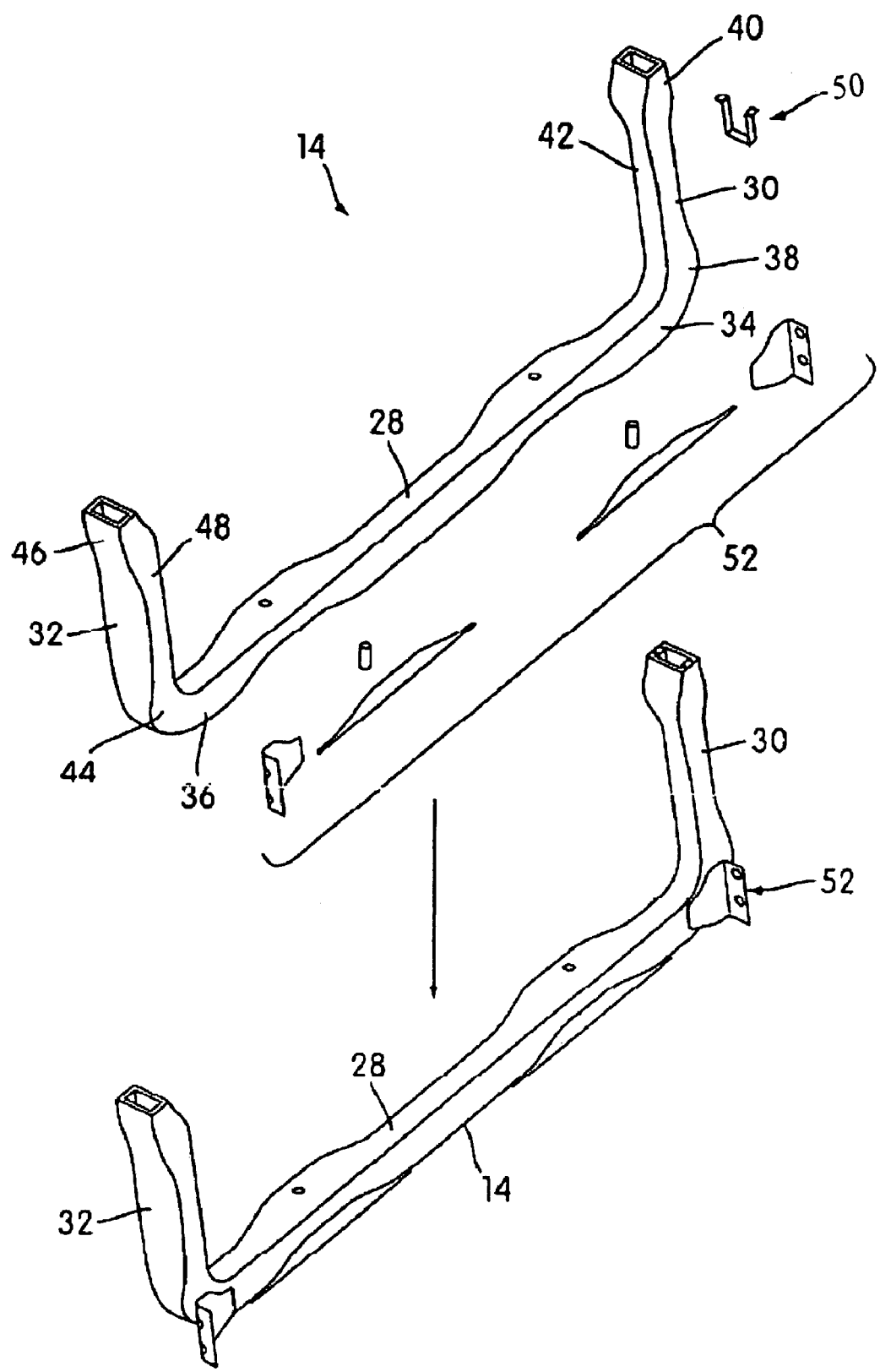
FIG. 2 is an exploded assembly view of a continuous, hydroformed tubular member of the frame shown in FIG. 1.

FIG. 2 illustrates the tubular member 14. In the illustrated embodiment, the tubular member 12 is substantially similar to the tubular member 14, so an understanding of one will suffice for an understanding of both. As illustrated, each of the first and second tubular members 12, 14 have a horizontal member 28, a first vertical member 30, and a second vertical member 32. The horizontal member 28 has a first end 34 and a second end 36. The first vertical member 30 has a first lower end 38 coupled to the first end 34 of the horizontal member 28. The first vertical member 30 also has a first upper pillar-free end 40 to form a first pillar 42 configured to form a terminal end of the upwardly-open rear bed. The second vertical member 32 has a second lower end 44 coupled to the second end 36 of the horizontal member 28. The second vertical member 32 also has a second upper pillar-free end 46 to form a second pillar 48 configured to form the terminal end of the upwardly-open rear bed.

In the illustrated embodiment, the horizontal member 28, the first vertical member 30, and the second vertical member 32 of each of the first and second tubular members 12, 14 together form a one-piece, unitary U-shaped member. Specifically, the first and second tubular members 12, 14 are each formed from an elongated substantially tubular body member that is hydroformed in a known manner to provide a one-piece, unitary U-shaped member. Further details of the hydroforming process are provided in U.S. Pat. Nos. 6,092, 865 and 6,533,348, the entireties of both being incorporated herein by reference.

The hydroformed tubular members 12, 14 have several advantages. To begin with, hydroforming increases durability at a lower mass, while maintaining structural stiffness. Also, hydroforming allows for improved dimensional accuracy since the width is fixed as the tubular members 12, 14 exit the forming die.

The tubular members 12, 14 may have any suitable cross-sectional configuration, e.g., rectangular, square, etc. Also, the cross-sectional configuration may vary along the length of the tubular members 12, 14, e.g., the cross-sectional configurations of the first and second vertical members 30, 32 may be different than the cross-sectional configuration of the horizontal member 28. Moreover, the cross-sectional configurations of the tubular members 12, 14 may vary with respect to one another.

The tubular members 12, 14 may include brackets and/or stiffening members attached thereto, e.g., by fasteners or welding, to facilitate connection to the other components of the frame 10 and to add rigidity. For example, FIG. 1 shows a bracket/stiffening member assembly 50 for the tubular member 12, and FIGS. 1 and 2 show a bracket/stiffening member assembly 52 for the tubular member 14.

When the frame 10 is mounted to the vehicle cab of a motor vehicle, the pair of pillars 42, 48 of the second tubular member 14 form a pair of rearwardmost-pillars 58, 60 of the vehicle and the pair of pillars 42, 48 of the first tubular member 12 form a pair of rearward-pillars 54, 56 that are positioned forward of the rearwardmost-pillars 58, 60 (e.g., see FIG. 1). In an embodiment, the rearward pillars 54, 56 are C-pillars and the rearwardmost-pillars 58, 60 are D-pillars, with the vehicle cab formed of A and B pillars. However, the vehicle cab may be constructed of more than two pillars, e.g., three pillars. As a result, the vehicle cab would be formed of A, B, and C pillars, and the pairs of rearward and rearwardmost pillars 54, 56 and 58, 60 of the frame 10 would become D and E pillars, respectively. FIG. 1 of U.S. Pat. No. 6,533,348 illustrates an example of a frame assembly having a vehicle cab and a rear bed, with the vehicle cab being constructed of more than two pillars. Thus, the frame 10 may be practiced with any type of vehicle cab having any suitable number of pillars.

In the illustrated embodiment, the rearward pillars 54, 56 are configured to receive a front panel 62, e.g., composite panel, that forms a forward side of the rear bed. However, it is contemplated that a rear wall of the vehicle cab may form the forward side of the rear bed.

The rearwardmost-pillars 58, 60 may be configured to receive a tailgate (not shown) that forms a rearward side of the rear bed. The tailgate may be a pivotally mounted tailgate for facilitating loading and unloading of the rear bed, or it may be fixedly secured in position.

Figure 6:
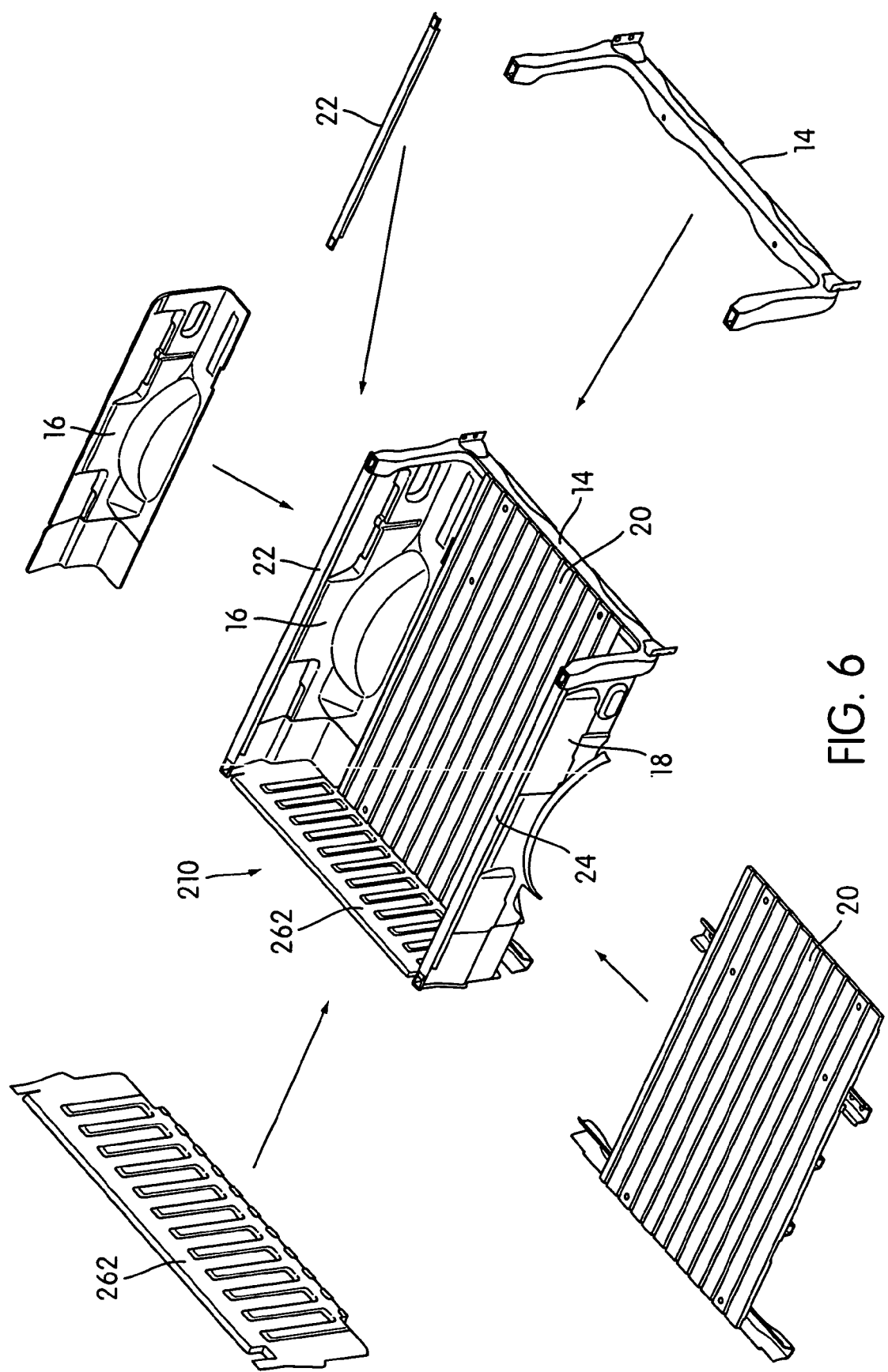
FIG. 6 is an exploded assembly view illustrating another embodiment of a frame.

Also, the frame 10 may be structured such that only one continuous, hydroformed tubular member is provided. For example, FIG. 6 illustrates another embodiment of a frame 210 having only the continuous, hydroformed tubular member 14. That is, the rearwardmost-pillars 58, 60 of the frame 210 are formed as part of a continuous, hydroformed tubular member 14 whereas the front panel 262 is provided without a hydroformed tubular member and coupled to the side panels 16, 18 and floor panel 20 in any suitable manner.

Figure 4:
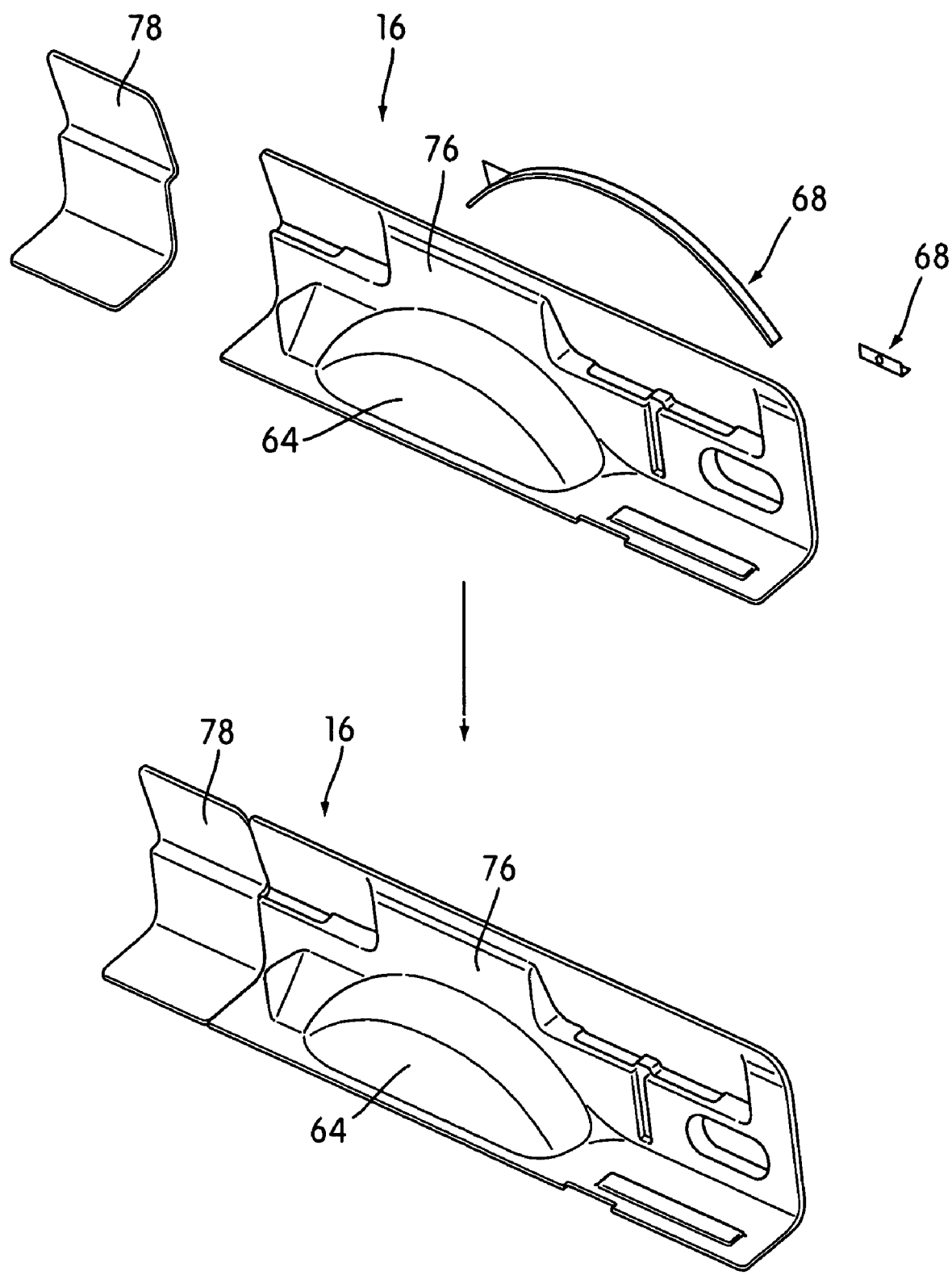
FIG. 4 is an exploded assembly view of a side panel of the frame shown in FIG. 1.

FIGS. 1 and 4 illustrate the first side panel 16. The second side panel 18 is a mirror image of the first side panel 16. Because the side panels 16, 18 are similar to one another, an understanding of one will suffice for an understanding of both. The first side panel 16 is coupled between the first vertical members 30 of the tubular members 12, 14. The first side panel 16 includes a first rear wheel well 64 to form a first side of the bed. The second side panel 18 is coupled between the second vertical members 32 of the tubular members 12, 14. The second side panel 18 includes a second rear wheel well 66 to form a second side of the bed.

The may include brackets and/or stiffening members attached thereto, e.g., by fasteners or welding, to facilitate connection to the other components of the frame 10 and to add rigidity. For example, FIGS. 1 and 4 show a bracket/ stiffening member assembly 68 for the side panels 16, 18. Further, the side panels 16, 18 may include side panel extensions that allow the length of the rear bed to be modified, as will be further discussed below.

Figure 5:
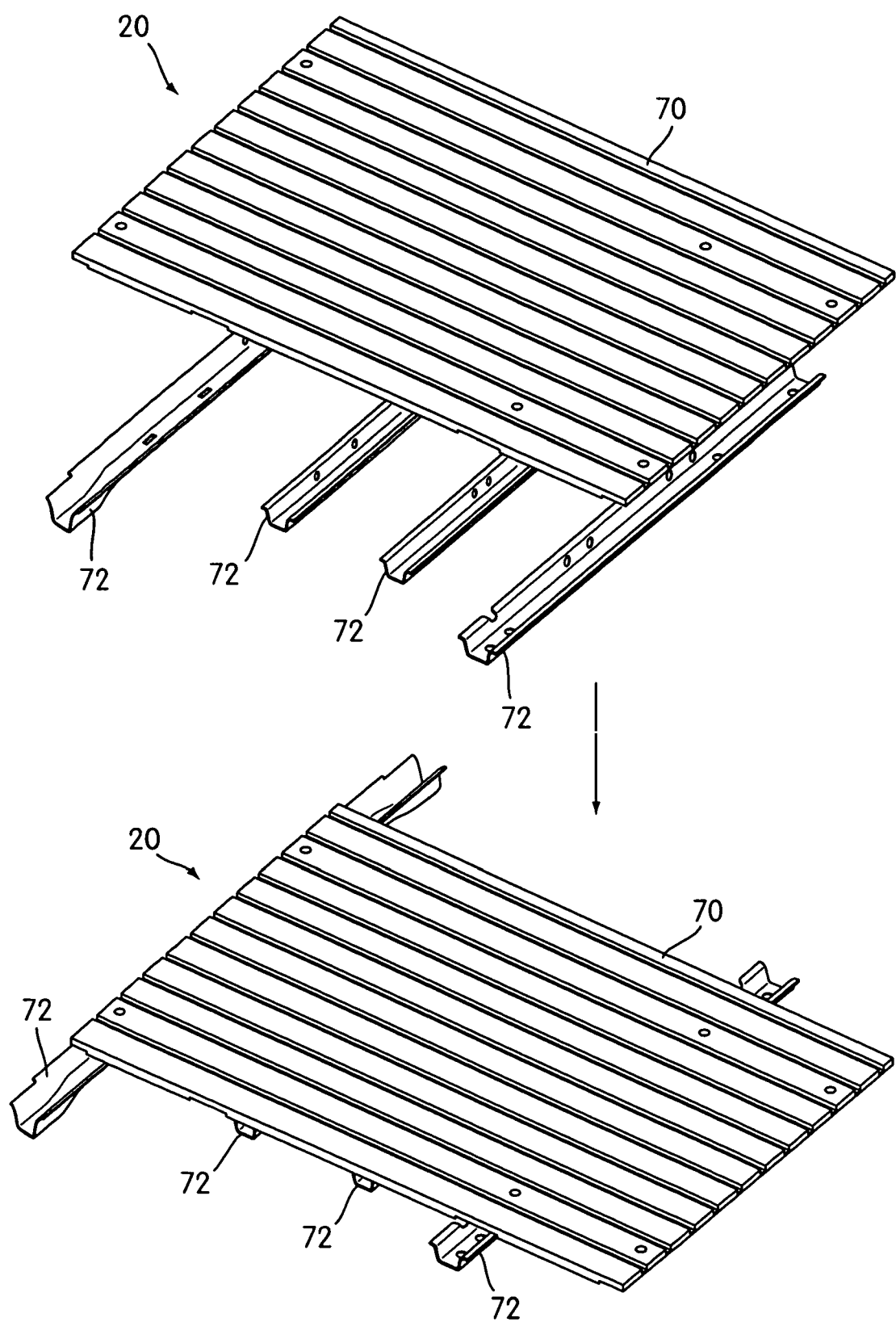
FIG. 5 is an exploded assembly view of a floor panel of the frame shown in FIG. 1.

As shown in FIGS. 1 and 5, the floor panel 20 is coupled between the first and second side panels 16, 18 and the horizontal members 28 of the tubular members 12, 14 to form the floor of the rear bed. The floor panel 20 includes a panel section 70, e.g., formed by roll forming, and a plurality of cross-members 72 (also referred to as bolsters or floor joists). The cross-members 72, e.g., formed by roll forming, are secured to the panel section 70 (e.g., by welding, fasteners) in space-apart relation and in a transverse orientation with respect to a longitudinal axis of the panel section 70. As illustrated, the cross-members 72 may have different lengths and cross-sectional configurations with respect to one another. The cross-members 72 reinforce the panel section 70 and provide mounting portions for coupling the floor panel 20 to the other components of the frame 10. As will be discussed below, the length of the floor panel 20 may be modified for various rear bed sizes.

Figure 3:
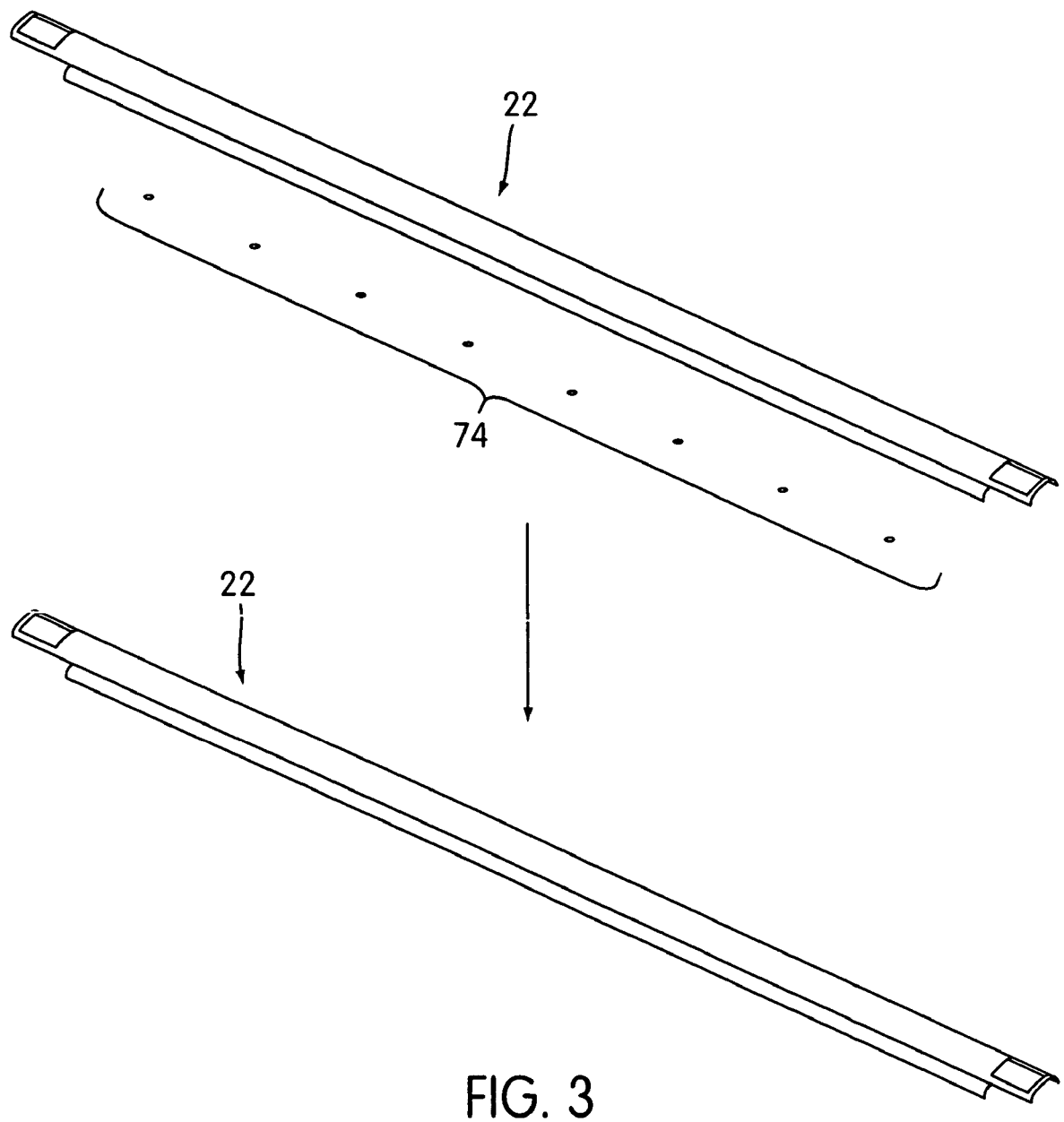
FIG. 3 is an exploded assembly view of a stringer member of the frame shown in FIG. 1.

FIGS. 1 and 3 illustrate the first stringer member 22. The second stringer member 24 is a mirror image of the first stringer member 22. Because the stringer members 22, 24 are similar to one another, an understanding of one will suffice for an understanding of both. The first and second stringer members 22, 24 are secured between the tubular members 12, 14 along an upper surface of the side panels 16, 18. Specifically, the first stringer member 22 extends from the first upper pillar-free end 40 of the first tubular member 12 to the first upper pillar-free end 40 of the second tubular member 14 to structurally secure and interconnect the first vertical members 30 of the first and second tubular members 12, 14. Similarly, the second stringer member 24 extends from the second upper pillar-free end 46 of the first tubular member 12 to the second upper pillar-free end 46 of the second tubular member 14 to structurally secure and interconnect the second vertical members 32 of the first and second tubular members 12, 14. The stringer members 22, 24 may be secured in position in any suitable manner, e.g., fasteners, welding. FIGS. 1 and 3 show a fastener assembly 74 for the stringer member 22. The stringer members 22, 24 may have any suitable cross-sectional configuration, e.g., C-shaped, and may be formed in any suitable manner.

In the illustrated embodiment, the first side panel 16 includes a first main side panel 76 and a first side panel extension 78 (see FIGS. 1 and 4). As illustrated, one end of the first main side panel 76 is coupled to the rearwardmost-pillar 58. One end of the first side panel extension 78 is attached to the other end of the first main side panel 76 and the other end of the first side panel extension 78 is coupled to the rearward-pillar 54 such that the first main side panel 76 and the first side panel extension 78 together form the first side of the bed.

Similarly, the second side panel 18 includes a second main side panel 80 and a second side panel extension 82 (see FIG. 1). As illustrated, one end of the second main side panel 80 is coupled to the rearwardmost-pillar 60. One end of the second side panel extension 82 is attached to the other end of the second main side panel 80 and the other end of the second side panel extension 82 is coupled to the rearward-pillar 56 such that the second main side panel 80 and the second side panel extension 82 together form a second side of the bed.

The side panel extensions 78, 82 may have any suitable cross-sectional configuration, e.g., similar to or different than that cross-sectional configurations of the main side panels 76, 80.

In the illustrated embodiment, the main side panels 76, 80 are of standard length. The side panel extensions 78, 82 enable the length of the rear bed to be easily modified for different vehicles. Specifically, to modify the length of the rear bed, the manufacturer can simply add suitably sized side panel extensions 78, 82 to the main side panels 76, 80 that correspond to a suitably sized floor panel 20. As a result, the side panel extensions 78, 82, the floor panel 20, and the stringer members 22, 24 are the only components of the frame 10 that are modified to provide different length rear beds. This allows the tubular members 12, 14 and the main side panels 76, 80 to remain as common parts and maintain the same size regardless of the desired bed length. Thus, the interchangeability of parts for different frame lengths simplifies the manufacturing process and reduces manufacturing costs. It is contemplated that no side panel extensions 78, 82 may be provided on the frame 10 should it be desired that the frame 10 be of standard length.

Each of the main side panels 76, 80 is formed with a mounting flange that provides a joint for mounting the respective side panel extension 78, 82 thereto. The side panel extensions 78, 82 may be mounted to the respective mounting flange in any suitable manner, e.g., fasteners, welding. The stringer members 22, 24 also maintain the connection between the main side panels 76, 80 and the side panel extensions 78, 82 and provide structural rigidity to the frame 10. Alternatively, the side panel extensions 78, 82 may be formed with mounting flanges. However, the main side panels 76, 80 and the side panel extensions 78, 82 may be coupled to one another in any other suitable manner.

Figure 7:
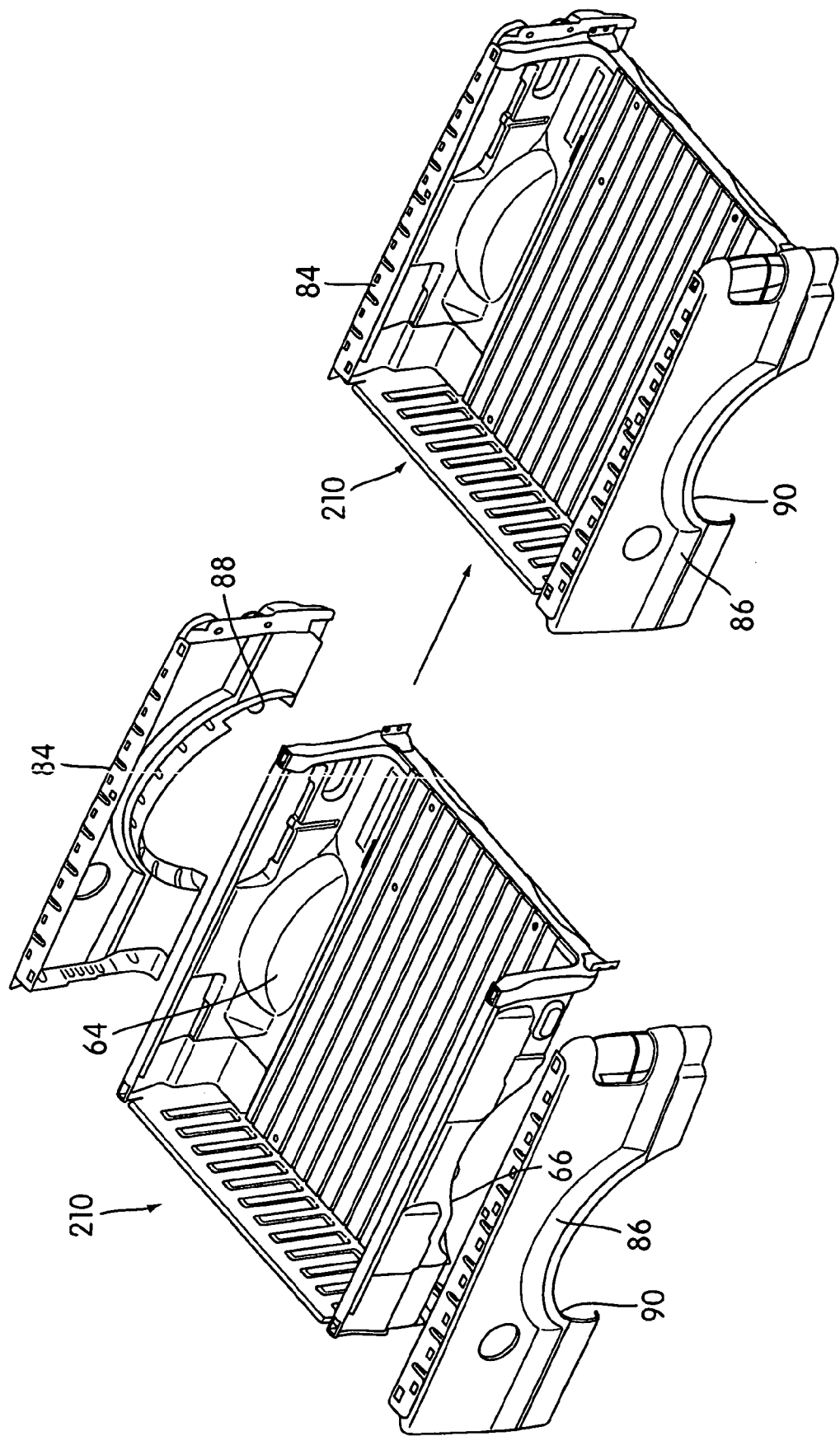
FIG. 7 is an exploded assembly view illustrating side body panels being coupled to the frame shown in FIG. 6.

As shown in FIG. 7, side body panels 84, 86 are coupled to the frame once assembled. In the illustrated embodiment, the side body panels 84, 86 are coupled to the frame 210 shown in FIG. 6. However, it should be understood that the side body panels 84, 86 may be coupled to the frame 10 shown in FIG. 1 in a similar manner. The side body panels 84, 86 extend the length of the frame, and cover respective main side panels 76, 80 and side panel extensions 78, 80 (if provided). The side panels 76, 80 also include wheel wells 88, 90 that align with the wheel wells 64, 66 of the main side panels 76, 80 when coupled to the frame.

Figure 8:
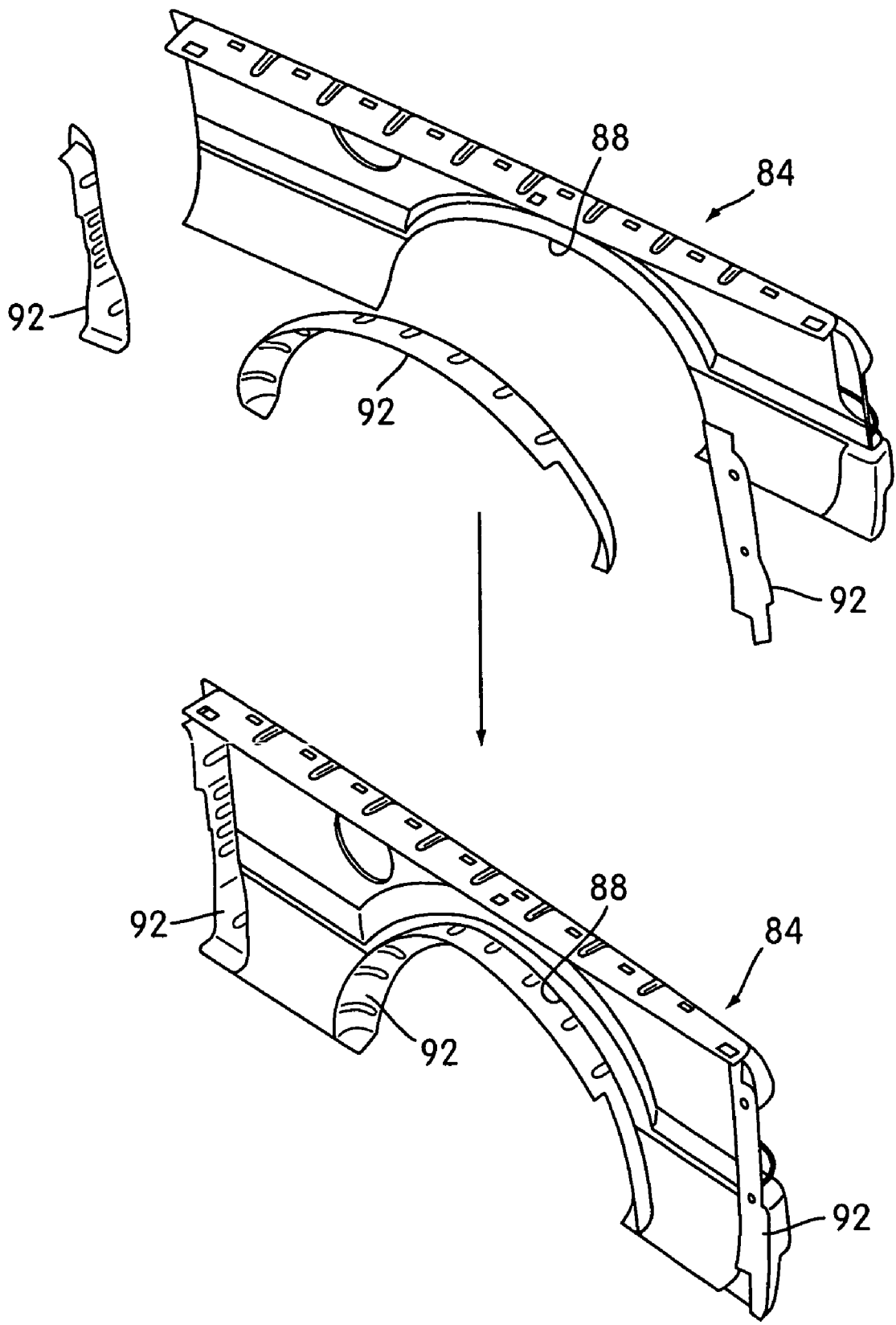
FIG. 8 is an exploded assembly view of a side body panel shown in FIG. 7.

The side body panels 84, 86 may include brackets and/or stiffening members to facilitate connection to the frame and add rigidity. For example, FIG. 8 shows a bracket/stiffening member assembly 92 for the side body panel 84. The side body panels 84, 86 may be coupled to the frame in any suitable manner, e.g., fasteners, welding.

The frame 10, 210 provides a simplified product that enables a simplified manufacturing process with respect to known frames. For example, by forming the tubular members 12, 14 in one piece by hydroforming, many parts can be eliminated. Also, by eliminating welding to form the tubular members 12, 14, the tubular members are more durable. Further, manufacturing costs are reduced due to interchangeability of parts for different frame lengths.

Also, whereas known frames for motor vehicles are generally manufactured from several parts with an elaborate process including stamping, forming, and welding, the present invention provides improvements over known frames to simplify the manufacturing process, reduce the number of parts, allow interchangeability of parts for different frame sizes, and improve durability.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A continuous, hydroformed tubular member, comprising:
a horizontal member having a first end and a second end, and a first bracket and stiffening member assembly therebetween;
a first vertical member having a first lower end coupled to said first end of said horizontal member, said first vertical member also having a first upper pillar-free end to form a first pillar configured to form a terminal end of an upwardly-open rear bed of a motor vehicle; and
a second vertical member having a second lower end coupled to said second end of said horizontal member, said second vertical member also having a second upper pillar-free end to form a second pillar configured to form the terminal end of the upwardly-open rear bed of a motor vehicle,
said first and second vertical members, each having a second bracket and stiffening member assembly;
said horizontal member, said first vertical member, and said second vertical member together forming a one-piece, unitary U-shaped member.

2. A frame for a motor vehicle, comprising:
a continuous, hydroformed tubular member having:
a horizontal member having a first end and a second end;
a first vertical member having a first lower end coupled to said first end of said horizontal member, said first vertical member also having a first upper pillar-free end to form a first pillar configured to form a terminal end of an upwardly-open rear bed of a motor vehicle; and
a second vertical member having a second lower end coupled to said second end of said horizontal member, said second vertical member also having a second upper pillar-free end to form a second pillar configured to form said terminal end of said upwardly-open rear bed of a motor vehicle,
said horizontal member, said first vertical member, and said second vertical member together forming a one-piece, unitary U-shaped member; a first side panel coupled to said first vertical member and including a first rear wheel well to form a first side of said bed;
a second side panel coupled to said second vertical member and including a second rear wheel well to form a second side of said bed; and
a floor panel coupled between said first and second side panels and said horizontal member of said tubular member to form the floor of said bed,
said tubular member forming a rearward-pillar that is configured to receive a front panel forming the forward side of said bed.

3. A frame according to claim 2, wherein said frame further comprises a second continuous, hydroformed tubular member that forms a rearwardmost-pillar that is configured to receive a tailgate, said rearward-pillar positioned forward of said rearward-most pillar.

4. A frame for a motor vehicle, comprising:
first and second continuous, hydroformed tubular members, each of said first and second tubular members having:
a horizontal member having a first end and a second end;
a first vertical member having a first lower end coupled to said first end of said horizontal member, said first vertical member also having a first upper pillar-free end to form a first
pillar configured to form a terminal end of an upwardly-open rear bed of a motor vehicle; and
a second vertical member having a second lower end coupled to said second end of said horizontal member, said second vertical member also having a second upper pillar-free end to form a second pillar configured to form said terminal end of said upwardly-open rear bed of a motor vehicle,
said horizontal member, said first vertical member, and said second vertical member together forming a one-piece, unitary U-shaped member;
a first stringer member extending from said first upper pillar-free end of said first tubular member to said first upper pillar-free end of said second tubular member to structurally secure and interconnect said first vertical members of said first and second tubular members; and
a second stringer member extending from said second upper pillar-free end of said first tubular member to said second upper pillar-free end of said second tubular member to structurally secure and interconnect said second vertical members of said first and second tubular members.

5. A frame according to claim 3, wherein said second tubular member comprises:
a horizontal member having a first end and a second end;
a first vertical member having a first lower end coupled to said first end of said horizontal member, said first vertical member also having a first upper pillar-free end to form a first pillar configured to form a terminal end of an upwardly-open rear bed of a motor vehicle; and
a second vertical member having a second lower end coupled to said second end of said horizontal member, said second vertical member also having a second upper pillar-free end to form a second pillar configured to form said terminal end of said upwardly-open rear bed of a motor vehicle.

* * * * *